(12) United States Patent
Kumar et al.

(10) Patent No.: US 8,530,545 B2
(45) Date of Patent: Sep. 10, 2013

(54) COPOLYMERS OF NANOPARTICLES, VINYL MONOMERS AND SILICONE

(75) Inventors: Ramesh C. Kumar, Maplewood, MN (US); Taun L. McKenzie, Hugo, MN (US); Ying-Yuh Lu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 369 days.

(21) Appl. No.: 12/810,107

(22) PCT Filed: Dec. 16, 2008

(86) PCT No.: PCT/US2008/086951
§ 371 (c)(1),
(2), (4) Date: Aug. 16, 2010

(87) PCT Pub. No.: WO2009/085740
PCT Pub. Date: Jul. 9, 2009

(65) Prior Publication Data
US 2010/0310865 A1   Dec. 9, 2010

Related U.S. Application Data

(60) Provisional application No. 61/017,463, filed on Dec. 28, 2007.

(51) Int. Cl.
C08L 83/00 (2006.01)
C08G 77/00 (2006.01)

(52) U.S. Cl.
USPC ............... 523/202; 528/10; 528/25; 528/27; 428/352; 977/773

(58) Field of Classification Search
USPC ............ 428/352; 528/25–27, 10; 523/202; 977/773, 788
See application file for complete search history.

(56) References Cited

U.S. PATENT DOCUMENTS

| | | | |
|---|---|---|---|
| 2,801,185 A | 7/1957 | Iler | |
| RE24,906 E | 12/1960 | Ulrich | |
| 3,786,116 A | 1/1974 | Milkovich et al. | |
| 3,842,059 A | 10/1974 | Milkovich et al. | |
| 4,046,795 A | 9/1977 | Martin | |
| 4,238,393 A | 12/1980 | Takamizawa et al. | |
| 4,522,958 A | 6/1985 | Das et al. | |
| 4,728,571 A | 3/1988 | Clemens et al. | |
| 4,783,490 A | 11/1988 | Eckberg et al. | |
| 5,032,460 A * | 7/1991 | Kantner et al. | 428/447 |
| 5,057,619 A | 10/1991 | Kumar et al. | |
| 5,202,190 A | 4/1993 | Kantner et al. | |
| 5,648,407 A | 7/1997 | Goetz et al. | |
| 7,101,616 B2 | 9/2006 | Arney et al. | |
| 7,241,437 B2 | 7/2007 | Davidson et al. | |
| 7,384,676 B2 | 6/2008 | Hongo et al. | |
| 2007/0260008 A1* | 11/2007 | Saito et al. | 524/547 |
| 2008/0146743 A1 | 6/2008 | Minge et al. | |

FOREIGN PATENT DOCUMENTS

| | | |
|---|---|---|
| CA | 1 233 290 | 2/1988 |
| EP | 0 250 248 | 12/1987 |
| EP | 1 544 857 A1 | 6/2005 |
| EP | 1 835 001 A1 | 9/2007 |
| WO | WO 2005/104213 | 11/2005 |
| WO | WO 2006/035646 A1 | 4/2006 |
| WO | WO 2006/065373 A1 | 6/2006 |
| WO | WO 2006/072408 A1 | 7/2006 |
| WO | WO 2006/073856 | 7/2006 |
| WO | WO 2008/143153 A1 | 11/2008 |

OTHER PUBLICATIONS

Liu et al., "Preparation of *Comb-like* Styrene Grafted Silica Nanoparticles", *J. Macromol. Sci. Part A—Pure and Applied Chem.*, A41, No. 9, pp. 1001-1010, (2004).

Mu et al., "Well-Defined Dendritic-Graft Copolymer Grafted Silica Nanoparticle by Consecutive Surface-Initiated Atom Transfer Radical Polymerizations", *Ind. Eng. Chem. Res.*, 46, pp. 3069-3072, (2007).

* cited by examiner

*Primary Examiner* — Hannah Pak

(74) *Attorney, Agent, or Firm* — Lisa P. Fulton; James A. Baker

(57) ABSTRACT

A copolymer comprises the reaction product of (a) (meth) acrylate functionalized nanoparticles, (b) vinyl monomer, and (c) mercapto-functional silicone. The (meth)acrylate functionalize nanoparticles are selected from the group consisting of silica nanoparticles, zirconia nanoparticles, titania nanoparticles, and combinations thereof.

20 Claims, No Drawings

COPOLYMERS OF NANOPARTICLES, VINYL MONOMERS AND SILICONE

CROSS REFERENCE TO RELATED APPLICATIONS

This application is a national stage filing under 35 U.S.C. 371 of PCT/US2008/086951, filed Dec. 16, 2008, which claims the benefit of U.S. Provisional Application No. 61/017,463, filed Dec. 28, 2007, the disclosure of which is incorporated by reference in their entirety herein.

FIELD

The present invention relates to copolymers of nanoparticles, vinyl monomers, and silicone.

BACKGROUND

Silicone-vinyl copolymers, including those having a vinyl polymeric backbone with silicone pendant groups (see, for example, U.S. Pat. No. 4,728,571 (Clemens et al.)) and those having a silicone polymeric backbone with acrylate pendant groups (see, for example, U.S. Pat. No. 5,202,190 (Kantner et al.)), are known in the art to be useful as release coatings for pressure-sensitive adhesive (PSA) products. When these release coatings are subjected to relatively high temperatures (for example, temperatures above about 50° C.), however, there can be an undesirable build up of peel force and sheet removal force in PSA products.

SUMMARY

In view of the foregoing, we recognize that there is a need in the art for silicone-vinyl copolymers that when used as release coatings are not as sensitive to relatively high temperatures as conventional silicone-vinyl copolymers.

Briefly, the present invention provides a copolymer comprising the reaction product of (a) (meth)acrylate functionalized nanoparticles, (b) vinyl monomer, and (c) mercapto-functional silicone. The (meth)acrylate functionalized nanoparticles are selected from the group consisting of silica nanoparticles, zirconia nanoparticles, titania nanoparticles, and combinations thereof. The mercapto-functional silicone is represented by the formula:

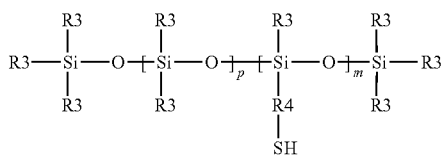

wherein:
p=1 to about 1000,
m=1 to about 40,
R3 are monovalent moieties that can be the same or different and are independently selected from the group consisting of alkyl, aryl, alkaryl, alkoxy, alkylamino, hydroxyl, and fluoroalkyl, and
R4 are divalent linking groups that can be the same or different and are independently selected from the group consisting of alkylene, alkarylene, and alkoxyalkylene.

As used herein, the terms "(meth)acryl", "(meth)acrylate", and "(meth)acrylic" refer to acryl and methacryl, acrylates and methacrylates, and acrylic and methacrylic.

The copolymers of the invention can be used as release coatings. Release coatings comprising the copolymers of the invention are more stable at relatively high temperatures than release coatings comprising conventional silicone-vinyl copolymers. In addition, release coatings comprising the copolymers of the invention exhibit stable peel force when a pressure-sensitive adhesive (PSA) is peeled from the release coating.

DETAILED DESCRIPTION

The copolymers of the invention comprise the reaction product of (meth)acrylate functionalized silica nanoparticles, vinyl monomer, and mercapto-functional silicone.

(Meth)Acrylate Functionalized Nanoparticles

Nanoparticles useful in the copolymers of the invention comprise silicon oxide, zirconium oxide, or titanium oxide. The silicon oxide (silica), zirconium oxide (zirconia), or titanium oxide (titania) nanoparticles have (meth)acrylate surface modification to enable the functionalized nanoparticles to copolymerize with reactive vinyl monomers and mercapto-functional silicone. Preferably, the (meth)acrylate functionalized nanoparticles are silica nanoparticles.

Nanoparticles useful in the invention are typically characterized by an average particle diameter size of from about 1 nm up to about 150 nm. As used herein, the term "nanoparticle diameter" (or "nanoparticle size") refers to the maximum cross-sectional dimension of a nanoparticle. Preferably, the nanoparticles are substantially spherical in shape and are relatively uniform in size and remain substantially non-aggregated.

Zirconia nanoparticles typically have a particle size from about 5 to about 150 nm (preferably, about 5 to about 75 nm; more preferably, about 5 to about 25 nm; most preferably, about 5 to about 15 nm). Zirconia nanoparticles useful in the invention are commercially available from Nalco Company (Naperville, Ill.) under the product designation Nalco™ OOSSOO8 and from Buhler (Uzweil, Switzerland) under the product designation WO or WOS. Zirconia nanoparticles can also be prepared as described in U.S. Pat. No. 7,241,437 (Davidson et al.).

Titania nanoparticles typically have a particle diameter size from about 5 to about 50 nm (preferably, about 5 to about 15 nm; more preferably, about 10 nm). Titania nanoparticles useful in the invention are commercially available from mknano (a division of M. K. Impex Canada, Ontario).

Silica nanoparticles typically have a particle diameter size of about 5 nm up to about 100 nm (preferably, of about 5 nm about to about 20 nm; more preferably of about 5 nm, about 8 nm, or about 20 nm).

A preferred class of silica nanoparticles that can be functionalized for use in the present invention is sols of silica, zirconia, or titania oxides. Sols of amorphous, semi-crystalline, and/or crystalline silica are particularly useful. Such sols can be prepared by a variety of techniques and in a variety of forms, which include hydrosols (where water serves as the liquid medium), organosols (where organic liquids are used), and mixed sols (where the liquid medium comprises both water and an organic liquid). Descriptions of the techniques and forms are described, for example, In U.S. Pat. Nos. 2,801,185 (Iler); 4,522,958 (Das et al.); and 5,648,407 (Goetz et al.).

Useful silica nanoparticles can also be commercially obtained as colloidal dispersions or sols from vendors such as, for example, Nalco Company, Naperville, Ill. (for example, Nalco™ 1040, 1042, 1050, 1060, 1130, 2326, 2327, and 2329 colloidal silicas and W.R. Grace & Co. (for example, Ludox™ colloidal silicas). Preferred commercially available silica nanoparticles include Nalco™ 1130, Nalco™ 2326, and Nalco™ 2327. Nalco™ 1130 silica nanoparticles are most preferred.

(Meth)acrylate functionalized silica nanoparticles can be prepared using coupling agents such as, for example, (meth)acrylate silane coupling agents. Preferred coupling agents include, for example 3-acryloxypropyltrimethoxysilane, 3-methacryloxypropyltrimethoxysilane (A-174 silane), gamma-methacryloxypropyltrimethoxysilane (Z-6030 silane), and methacryloxypropyldimethylchlorosilane (M-8542 silane). A-174 silane is the most preferred silane coupling agent.

The preparation of methacryloxysilane surface functionalized silica sol is described, for example, in U.S. Pat. No. 7,101,616 (Arney et al). The preparation of both acryloxysilane and methacryloxysilane surface functionalized nanoparticles is described, for example, in WO 2006/073856.

A preferred (meth)acrylate functionalized silica nanoparticle can be represented by the general formula:

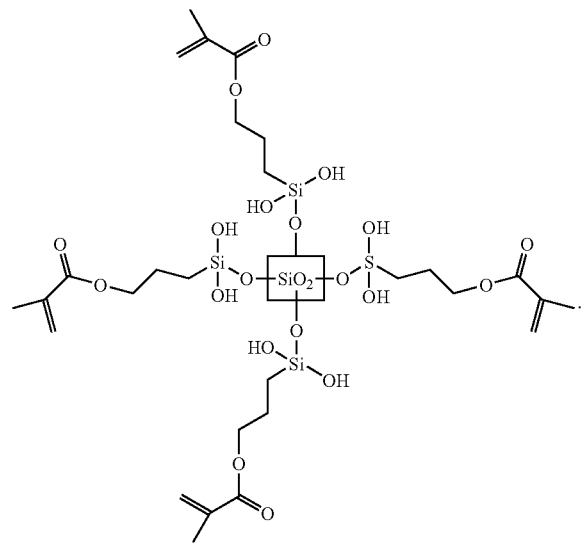

Vinyl Monomers

Examples of useful vinyl monomers for making the copolymers of the invention include, but are not limited to, (meth)acrylates, allylic compounds, vinyl ethers, vinyl esters, and the like. Useful vinyl monomers include, for example, hydroxy ethyl (meth)acrylate, hydroxy butyl (meth)acrylate, isobutyl (meth)acrylate, octadecyl (meth)acrylate, isobornyl (meth)acrylate, hydroxy hexyl (meth)acrylate, hydroxy decyl (meth)acrylate, hydroxy dodecyl (meth)acrylate, methyl (meth)acrylate, (meth)acrylic acid, N-vinyl 2-pyrrolidinone, and hydroxypropyl (meth)acrylic acid, 2-methacryloxypropyltrimethoxysilane, 3-methacryloxypropyltriethoxysilane, 3-acryloxypropyltrimethoxysilane, 3-methacryloxypropyltrichlorosilane, glycidyl (meth)acrylate, acrylonitrile, N-methylol methacrylamide, N-methylol acrylamide, and the like.

Preferred monomers include, for example, (meth)acrylate monomers, styrene, acrylic acid, acrylonitrile, N-vinyl pyrrolidone, and mixtures thereof. More preferred monomers include, for example, methyl (meth)acrylate, isobornyl (meth)acrylate, butyl (meth)acrylate, isopropyl (meth)acrylate, octadecyl (meth)acrylate, styrene, (meth)acrylic acid, acrylonitrile, N-vinyl pyrrolidone, and mixtures thereof.

Preferably, (meth)acrylate monomers are used; more preferably, methyl acrylate and acrylic acid are used.

Mercapto-Functional Silicone

Mercapto-functional silicone that are useful in the making the copolymers of the invention can be represented by the formula:

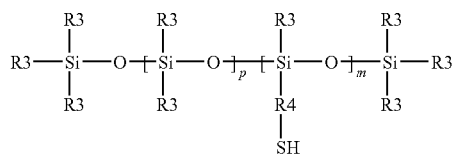

wherein:
p=1 to about 1000,
m=1 to about 40,
R3 are monovalent moieties that can be the same or different and are independently selected from the group consisting of alkyl, aryl, alkaryl, alkoxy, alkylamino, hydroxyl, and fluoroalkyl, and
R4 are divalent linking groups that can be the same or different and are independently selected from the group consisting of alkylene, alkarylene, and alkoxyalkylene.

Preferably, p=about 96 to about 200; more preferably, p=96. Preferably, m=about 4 to about 8; more preferably, m=4. Preferably, R3 are alkyls that can be the same or different; more preferably, R3 are $C_1$-$C_4$ alkyls that can be the same or different; most preferably, R3 are methyl groups. Preferably, R4 are alkylenes that can be the same or different; more preferably, R4 are $C_1$-$C_3$ alkylenes or $C_7$-$C_{10}$ alkarylenes that can be the same or different; most preferably, R4 are propylene groups.

Useful mercapto-functional silicone compounds of the above formula can be prepared by any known method, including, for example, (1) cohydrolysis-condensation of a mixture consisting of an organoalkoxysilane having one or more mercapto-substituted hydrocarbon groups and an alkoxysilane possessing no mercapto groups, (2) reaction of an organoalkoxysilane having one or more mercapto-substituted hydrocarbon groups with a cyclic organopolysiloxane or with a silanol terminated diorganopolysiloxane possessing no mercapto groups, (3) an equilibration reaction of a cyclic or linear chain organopolysiloxane having one or more mercapto-substituted hydrocarbon groups with a cyclic or linear chain organopolysiloxane having no mercapto groups, (4) reaction of an organopolysiloxane having one or more nucleophilic groups such as an aminoalkyl with an electrophilic reagent such as 3-mercaptopropionic acid, in order to yield a mercapto-derivatized organopolysiloxane, and (5) reaction of an organopolysiloxane having one or more electrophilic groups such as a haloalkyl with a nucleophilic reagent such as an alkali metal sulfide to yield a mercapto-derivatized organopolysiloxane. U.S. Pat. Nos. 4,238,393 (Takamizawa et al); 4,046,795 (Martin); 4,783,490 (Eckberg et al.) and Canadian Patent No. 1,233,290 describe the preparation of mercapto-functional silicone compounds.

Other preferred methods for preparing mercapto-functional silicone compounds, in particular those with terminal functionality, are described in detail in U.S. Pat. No. 5,032,460 (Kantner et. al). For example, an organopolysiloxane diamine such as those described in EP 0 250 248 ("Leir") can be reacted with a compound such as γ-thiobutyrolactone to yield dimercapto functional silicone compound. Alternatively, a benzyl chloride functional material such as those described in U.S. Pat. No. 5,057,619 (Kumar et al.) can be reacted with an alkali metal hydrosulfide such as sodium hydrosulfide in order to from mono-functional or di-functional mercapto silicone compounds.

A preferred mercapto-functional silicone is:

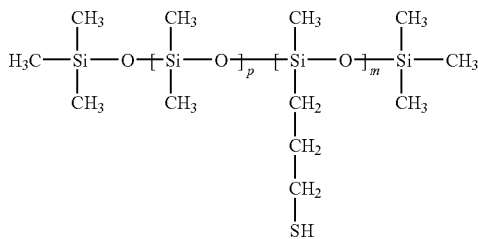

wherein p=96 and m=4. This mercapto-functional silicone can be commercially obtained as KF-2001 from Shin-Etzu Silicones of America, Inc., Akron, Ohio.

Copolymers

The present invention provides vinyl-silicone graft copolymers with silica nanoparticles polymerized into the vinyl portions. The copolymers of the invention can be generally represented by the following formula:

R2 is represented by the formula:

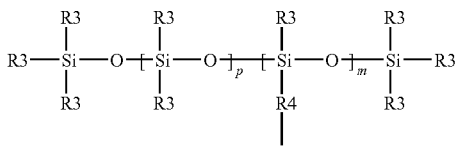

wherein:
p=1 to about 1000,
m=1 to about 40,
R3 are monovalent moieties that can be the same or different and are independently selected from the group consisting of alkyl, aryl, alkaryl, alkoxy, alkylamino, hydroxyl, and fluoroalkyl, and
R4 are divalent linking groups that can be the same or different and are independently selected from the group consisting of alkylene, alkarylene, and alkoxyalkylene.

Preferably, Q is a random copolymer formed from monomers selected from the group consisting of (meth)acrylate

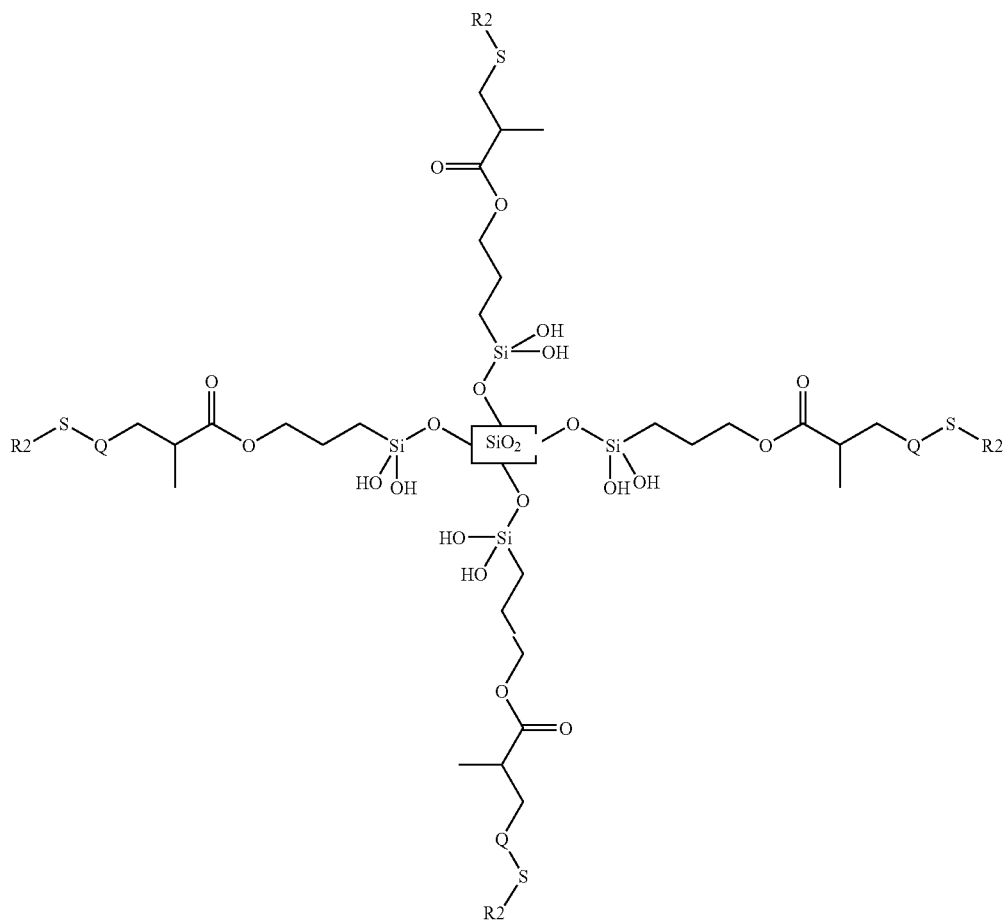

wherein:

represents a silica nanoparticle,
Q is a vinyl polymeric segment having an average molecular weight of about 500 to about 100,000, and monomers, styrene, acrylic acid, acrylonitrile, N-vinyl pyrrolidone, and mixtures thereof. More preferably, Q is formed from monomers selected from the group consisting of methyl (meth)acrylate, isobornyl (meth)acrylate, butyl (meth)acrylate, isopropyl (meth)acrylate, octadecyl (meth)acrylate, styrene, (meth)acrylic acid, acrylonitrile, N-vinyl pyrrolidone, and mixtures thereof. Q preferably has an average molecular weight of about 4000 to about 8000. Preferably, p, m, R3 and R4 are as described above.

It will be appreciated by one of skill in the art that the above formula is given merely as a representation of one possible copolymer of the invention and is not intended to limit the copolymers of this invention. One of skill in the art will appreciate, for example, that a silica particle may have more than or less than four vinyl-silicone copolymer "branches" attached to it, and that some of the —OH groups may further react and crosslink.

Method

The copolymers of the invention can be synthesized by mixing vinyl monomer, a mercapto-functional silicone as described above, (meth)acrylate functionalized nanoparticles, and an initiator capable of forming free radicals upon being subjected to a means of initiation. Optionally, a solvent can be added.

Useful initiators for synthesizing the copolymers of the invention are well known to practitioners skilled in the art and are detailed in Chapters 20 & 21 Macromolecules, Vol. 2, 2nd Ed., H. G. Elias, Plenum Press, 1984, New York. Useful thermal initiators for use in the method of the present invention include, but are not limited to, the following:

azo compounds such as 2,2-azo-bis-(isobutyronitrile), dimethyl 2,2'-azo-bis-isobutyrate, azo-bis-(diphenyl methane), 4-4'-azo-bis-(4-cyanopentanoic acid);

peroxides such as benzoyl peroxide, cumyl peroxide, tert-butyl peroxide, cyclohexanone peroxide, glutaric acid peroxide, lauroyl peroxide, methyl ethyl ketone peroxide;

hydrogen peroxide, hydroperoxides such as tert butyl hydroperoxide and cumene hydroperoxide;

peracids such as peracetic acid and perbenzoic acid; potassium persulfate; and peresters such as diisopropyl percarbonate.

Certain of these initiators (in particular the peroxides, hydroperoxides, peracids, and peresters) can be induced to decompose by addition of a suitable catalyst rather than thermally. This redox method of initiation is described in Elias, Chapter 20.

Useful photochemical initiators include but are not limited to benzoin ethers such as diethoxyacetophenone, oximinoketones, acylphosphine oxides, diaryl ketones such as benzophenone and 2-isopropyl thioxanthone, benzil and quinone derivatives, and 3-ketocoumarins as described by S. P. Pappas, J. Rad. Cur., July 1987, p. 6.

Preferably, the initiator used comprises a thermally decomposed azo or peroxide compound. Most preferably, the initiator used comprises 2,2'-azobis(isobutyronitrile).

The homolytic decomposition of the initiator to form free radicals can be induced by heat energy (thermolysis), light energy (photolysis) or the addition of a suitable catalyst. "Initiator free" polymerization may also be induced electronically or by exposure to ionizing radiation.

The decomposition rate of the initiator during thermolysis depends on the chemical nature of the initiator, the reaction temperature, and the solvent (if any) used. The decomposition rate of the initiator during photolysis depends mainly on the chemical nature of the initiator and the intensity and wavelength of the radiation.

Light energy can be supplied to induce the homolytic decomposition of the initiator by means of visible or ultraviolet sources including low intensity fluorescent black light lamps, medium pressure mercury arc lamps, and germicidal mercury lamps. The selection of a preferred light energy source will depend on the chosen photoinitiator.

The decomposition of the initiator can also be accomplished by using a suitable catalyst. Catalyst induced initiator decomposition involves an electron transfer mechanism resulting in a reduction-oxidation (redox) reaction. Initiators such as peroxides and hydroperoxides are more susceptible to this kind of decomposition. Catalysts useful in inducing the homolytic decomposition of the initiator include, but are not limited to, the following: amines, and metal ions used in combination with peroxide or hydroperoxide initiators, and bisulfite or mercapto compounds used in combination with persulfate initiators.

The preferred method of initiation comprises thermolysis which can be readily used in standard reactors. Thermolysis also provides ease of control of the reaction rate and exotherm.

As indicated previously, the use of a solvent is optional in the polymerization. Preferably, a solvent is utilized for reasons of decreasing the viscosity during the reaction to allow for efficient stirring and heat transfer. Solvents useful in the polymerization process typically possess a dielectric constant greater than about 2.5. The requirement that the solvent possess a dielectric constant above about 2.5 is to ensure that the polymerization mixture remains homogeneous during the course of the reaction. Preferably, the solvent utilized possesses a dielectric constant ranging from about 4 to about 30 for in order to provide the best solvating power for the polymerization mixture.

Suitable solvents include, but are not limited to, esters such as ethyl acetate and butylacetate; ketones such as methyl ethyl ketone and acetone; alcohols such as methanol and ethanol; and mixtures of one or more of these.

Other solvent systems are useful. Aliphatic and aromatic hydrocarbons are not useful by themselves as solvents, since they lead to the precipitation of the vinyl polymeric segment from solution, resulting in a non-aqueous dispersion polymerization. Such hydrocarbon solvents may be useful when admixed with other more polar solvents provided that the net dielectric constant of the mixture is greater than about 2.5.

The solvent, if utilized in the free radical polymerization, may be any substance which is liquid in a temperature range of about −10° C. to about 50° C., has a dielectric constant above about 2.5, does not interfere with the energy source or catalyst used to dissociate the initiator to form free radicals, is inert to the reactants and product, and will not otherwise adversely affect the reaction. The amount of solvent, if used, is generally about 30 to 80 percent by weight based on the total weight of the reactants and solvent. Preferably, the amount of solvent utilized ranges from about 40 to about 65 percent by weight based upon the total weight of the reactants and solvent.

In addition to solution polymerization herein described, the copolymerization may be carried out by other well known techniques such as suspension, emulsion and bulk polymerization. Solution polymerization is preferred.

The vinyl monomer charge, the initiator, the mercapto-functional silicone compound, the functionalized silica nanoparticles, and any solvent employed can be charged into any appropriate vessel. Typically, the vinyl monomer charge is about 5 to about 60 weight percent, the initiator is about 0.2 to about 2 weight percent, the silicone compound is about 5 to about 60 weight percent, the nanoparticles are about 1 to about 10 weight percent, and the solvent is 0 to about 90 weight percent (preferably, about 40 to about 90 weight percent), all based upon the total weight of the charges.

In some embodiments, the weight ratio of (meth)acrylate functionalized silica nanoparticles to vinyl monomer and mercapto-functional silicone is about 10:90 or less (preferably, about 5:95 or less; more preferably, about 2:98). In some embodiments the weight ratio of mercapto-functional silicone to vinyl monomer is between about 10:90 and about 30:70.

If photolysis is conducted to decompose the initiator, the reactants and any solvent employed are charged into an energy source-transparent vessel and therein subjected to the energy source. If the energy source is ultraviolet light radiation, a suitable ultraviolet light-transparent vessel is utilized. If thermolysis is used to decompose the initiator, the reactants and any solvent employed are charged into a suitable glass or metal reactor and therein subjected to the thermal energy source. Typically, the reaction can be carried out at a temperature between about room temperature and about 120° C. (preferably, between about 50° C. and about 70° C.). If catalysis is used to decompose the initiator, a glass or metal reactor can also be utilized.

The reaction is preferably conducted in a vessel with agitation to permit uniform exposure of the reactants to the energy source. While most of the reactions have been conducted by employing a batch process, it is possible to utilize the same technology in a continuous polymerization operation.

Reaction times on the order of about 10 to about 40 hours are typical, depending upon the amount and type of solvent used, the amount and type of initiator used, temperatures or photolytic energy supplied, and the nature of the monomer.

The copolymers of the present invention may, when necessary or desirable, be blended with a compatible modifier in order to optimize physical properties. The use of such modifiers is common in the art. For example, it may be desirable to include such materials as pigments, fillers, stabilizers, or various polymeric additives.

The copolymers of the present invention can be recovered by standard procedures such as precipitation after polymerization into a suitable organic solvent such as methanol, hexane, or the like. Standard extraction techniques also can be used if desired.

Uses

Surprisingly, the polymerization of the vinyl monomer, a mercapto-functional silicone, and (meth)acrylate functionalized nanoparticle does not result in gelling. Gels are single macromolecules formed as an infinite network by crosslinking of polymer chains, and are thus insoluble in all solvents below their decomposition temperature (see, for example, *Principles of Polymerization*, 3$^{rd}$ ed., Wiley & Sons, p. 108, (1991)).

The copolymers of the invention can therefore be utilized in coatable compositions. As used herein, the term "coatable" or "coatable composition" means that the composition is soluble or dispersible in solvents or water and is substantially gel-free and that it can be applied to a substrate using standard coating methods. If desired, the coatable compositions can be diluted or dispersed in a liquid (for example, water and/or an organic solvent) before coating a substrate. Preferably, the coating compositions contain from about 2 to about 20 percent solids (more preferably, about 5 to about 10 percent), based upon the weight of the coating composition.

The coatable compositions can be applied to a substrate (or articles comprising a substrate) by standard methods such as, for example, spraying, padding, dipping, roll coating, brushing, or exhaustion. The composition can then be dried to remove any remaining water or solvent.

The coatable compositions are useful as release coatings, and can be applied to surfaces requiring release properties from adhesives. One method of preparation of the release compositions of this invention provides copolymers of high purity, which can be coated directly from the polymerization solvent. The resultant coatings do not require curing or crosslinking However, if solvent resistance is desired for a particular application, crosslinking can be effected by standard methods well known in the art, such as radiation curing (electron beam or ultraviolet light) or chemical crosslinking.

The release coatings of the invention are best used as a coating for a solid substrate, which can be a sheet, fiber, or shaped object. However, the preferred substrates are flexible substrates used for pressure-sensitive adhesive products. Suitable substrates include paper, metal sheets and foils, nonwoven fabrics, and films of thermoplastic resins such as polyesters, polyamides, polyolefins, polycarbonates, polyvinyl chloride, etc., although any surface requiring release toward adhesives can be used. Primers known in the art can be utilized to aid in adhesion of the coating to the substrate, but they are not generally necessary.

The release coating compositions can be applied to suitable substrates by means of conventional coating techniques. The resultant coatings provide effective release for a wide variety of conventional pressure-sensitive adhesives such as natural rubber-based, acrylic, and other synthetic film-forming elastomeric adhesives.

The release coating compositions provide stable peel force, even in hot and humid conditions. For example, the release coating compositions have a peel force build ratio of less than about 1.4. As used herein, "peel force build ratio" is the ratio of peel force after aging for 2 weeks at 65° C. to initial peel force.

The release coating compositions are especially useful in release liners and in coated sheet materials (for example, a flexible sheet having the release coating covering at least a portion of its first major surface and an adhesive covering as least a portion of its second major surface). Advantageously, the release coatings of the invention on coated sheet materials are receptive to water- and oil-based inks (for example, ink pens and markers).

EXAMPLES

Objects and advantages of this invention are further illustrated by the following examples, but the particular materials and amounts thereof recited in these examples, as well as other conditions and details, should not be construed to unduly limit this invention.

Materials

| Designator | Name, Formula and/or structure | Availability |
| --- | --- | --- |
| MEK | methyl ethyl ketone | Sigma-Aldrich |
| Ethanol | $C_2H_5OH$ | Sigma-Aldrich |
| Methanol | $CH_3OH$ | Sigma-Aldrich |
| KF-2001 | mercapto functional silicone | Shin-Etsu |
| VAZO-64 | Azo bisisobutryonitrile | DuPont |
| NVP | N-Vinyl pyrrolidone | Sigma-Aldrich |
| MA | methyl acrylate | Sigma-Aldrich |
| AA | Acrylic Acid | Sigma-Aldrich |
| Nalco 2326 | 5 nm silica nanoparticles | Nalco |
| Nalco 1130 | 8 nm silica nanoparticles | Nalco |
| Isooctyl silane | | Sigma-Aldrich |
| Prostab ™ 5198 | polymerization inhibitor | CIBA Specialty Chemicals - Additive |
| MMA | methyl methacrylate | Sigma-Aldrich |
| IBMA | isobutyl methacrylate | Sigma-Aldrich |
| A-174 | 3-methacryloxypropyl trimethoxy silane | Sigma-Aldrich |

Comparative Example

KF-2001/NVP/MA/AA, 33.7/37.5/24.8/4

In a narrow mouthed quart jar were charged 40.44 g KF-2001 (mercapto functional silicone), 45 g NVP(N-vinyl pyrrolidone), 29.76 g MA (methyl acrylate), 4.80 g AA (acrylic acid), 180 g MEK and 0.3602 g VAZO-64 (azobisisobutyronitrile). The resulting homogeneous mixture was purged with $N_2$ for 5 minutes. The bottle was sealed and tumbled in a hot water bath at 55° C. for 24 hr. To invert into waterborne, 15 g of the above solventborne (39% solids in MEK) was charged into an 8 oz open mouth jar followed by 52 g deionized (DI) $H_2O$ and 0.25 g ammonium hydroxide. The resulting homogenous dispersion was vacuum stripped on a rotary evaporator (Rotovap) at 50° C. to remove MEK. After removing essentially all MEK, 10.3% solids waterborne material was obtained.

Synthesis of Methacryl Modified (A-174 Modified) 5 Nm Silica Particles

Nalco 2326 silica sol (400 g), Isooctyl silane (5.4 g), A-174 silane (32.6 g), 80/20 mix of ethanol/methanol (320 g) and ProStab™ 5198 (0.016 g) were charged to a 3 neck 1 L round bottom flask equipped with stirrer, vacuum pump, cold water condenser and hot oil bath. A Therm-o-Watch (TOW) controller was used for the hot oil bath. Dispersion was refluxed for four hours with the TOW set at 80° C. Dispersion was then solvent exchanged from the water and alcohol to MEK via vacuum distillation. Resultant surface modified nanosilica dispersion was approximately 35% solids in MEK.

Synthesis of Methacryl Modified (A-174 Modified) 8 Nm Silica Particles

Nalco 1130 silica sol (400 g), Isooctyl silane (6.0 g), A-174 (36.7 g), 80/20 mix of ethanol/methanol (320 g) and ProStab™ 5198 (0.016 g) were charged to a 3 neck 1 L round bottom flask equipped with stirrer, vacuum pump, cold water condenser and hot oil bath. A Therm-o-Watch (TOW) controller was used for the hot oil bath. Dispersion was refluxed for four hours with the TOW set at 80° C. Dispersion was then solvent exchanged from the water and alcohol to MEK via vacuum distillation. Resultant surface modified nanosilica dispersion was approximately 32.2% solids in MEK.

Example 1

Synthesis of KF-2001/NVP/MA/AA/A-174 Modified 5 Nm Silica, 33.7/35.5/24.8/4/2

In a narrow mouthed quart jar were charged 40.44 g KF-2001 (mercapto functional silicone), 42.60 g NVP(N-vinyl pyrrolidone), 29.76 g MA (methyl acrylate), 4.80 g AA (acrylic acid), 6.86 g A-174 modified 5 nm silica (35% solids in MEK), 175.54 g MEK and 0.3602 g VAZO-64 (azobisisobutyronitrile). The resulting homogeneous mixture was purged with $N_2$ for 5 minutes. The bottle was sealed and tumbled in a hot water bath at 55° C. for 24 hr. To invert into waterborne, 15 g of above solventborne (38.44% solids in MEK) was charged into an 8 oz open mouth jar followed by 52 g DI $H_2O$ and 0.22 g ammonium hydroxide. The resulting homogenous dispersion was vacuum stripped on a Rotovap at 50° C. to remove MEK. After removing essentially all MEK, 10.3% solids waterborne material was obtained.

Example 2

Synthesis of KF-2001/NVP/MA/AA/A-174 Modified 5 Nm Silica, 33.7/32.5/24.8/4/5

The procedure of Example 1 was repeated, except the charges were as follows: 40.44 g KF-2001, 39 g NVP, 29.76 g MA, 4.8 g AA, 17.14 g A-174 5 nm modified silica (35% solids in MEK), 168.86 g MEK and 0.3605 g VAZO-64. To invert into waterborne, 15 g of above solventborne (38.25% solids in MEK) was charged into an 8 oz open mouth jar followed by 51.6 g DI $H_2O$ and 0.22 g ammonium hydroxide. The resulting homogenous dispersion was vacuum stripped on a Rotovap at 50° C. to remove MEK. After removing essentially all MEK, 10.4% solids waterborne material was obtained.

Example 3

Synthesis of KF-2001/NVP/MA/AA/8 Nm A-174 Modified Silica, 33.7/32.5/19.8/4/10

The procedure of Example 1 was repeated, except the charges were as follows: 40.44 g KF-2001, 39 g NVP, 23.76 g MA, 4.80 g AA, 37.27 g A-174 modified 8 nm silica (32.2% solids in MEK), 154.73 g MEK and 0.3600 g VAZO-64. To invert into waterborne, 66.3 g of above solventborne (35.9% solids in MEK) was charged into a 1 liter flask followed by 214.6 g DI $H_2O$ and 0.89 g ammonium hydroxide. The resulting homogenous dispersion was vacuum stripped on a Rotovap at 50° C. to remove MEK. After removing essentially all MEK, 10.3% solids waterborne material was obtained.

Example 4

Synthesis of KF-2001/NVP/MA/AA/8 Nm A-174 Modified Silica, 33.7/27.5/24.8/4/10

The procedure of Example 1 was repeated, except the charges were as follows: 40.44 g KF-2001, 33 g NVP, 29.76 g MA, 4.80 g AA, 37.27 g A-174 modified 8 nm silica (32.2% solids in MEK), 154.73 g MEK and 0.3603 g VAZO-64. To invert into waterborne, 65.3 g of above solventborne (36.3% solids in MEK) was charged into a 1 liter flask followed by 213.3 g DI $H_2O$ and 0.89 g ammonium hydroxide. The resulting homogenous dispersion was vacuum stripped on a Rotovap at 50° C. to remove MEK. After removing essentially all MEK, 10% solids waterborne material was obtained.

Example 5

Synthesis of KF-2001/MMA/MA/AA/A-174 Modified 5 Nm Silica, 30/40/20/5/5

The procedure of Example 1 was repeated, except the charges were as follows: 36 g KF-2001, 48 g MMA, 24 g MA, 6 g AA, 17.14 g A-174 modified 5 nm silica (35% solids in MEK), 168.86 g MEK and 0.3603 g VAZO-64. The final solids were 39.4% in MEK.

Example 6

Synthesis of KF-2001/IBMA/A-174 Modified 5 Nm Silica, 60/35/5

The procedure of Example 1 was repeated, except the charges were as follows: 72 g KF-2001, 42 g IBMA (isobutyl methacrylate), 17.14 g A-174 modified silica (35% solids in MEK), 168.86 g MEK and 0.3604 g VAZO 64. The final solids were 38.9% in MEK.

Coating of Examples 1-4 for Testing as Low Adhesion Backsizes (LABs)

The above waterborne LABs described in Examples 1-4 and the Comparative Example were diluted to 10% solids with DI $H_2O$. The LABs were coated using a gravure coater onto Boise Yellow paper (Boise Cascade, LLC) at 15 m/min (50 ft/min) and dried by a couple of hot cans at 150° C. with web tension set at 8. The backside of the paper was moisturized with a 0.7% Kelzan S solution (Kelzan Co.). The coatings were laminated against Post-it™ Super Sticky™ Notes (3M Company) and pressured for 30 seconds at 20.7 MPa (3000 psi). The sheet removal force (i.e., peel force) of each LAB was measured according to ASTM D3330 initially and after aging for 2 weeks at 65° C. The results are listed in the table below. Adhesion was measured according to ASTM D3330 initially and after aging by removing or peeling the adhesive coated sheet from the release coating of the invention and then laminating the sheet onto a primed polyester film (available from Mitsubishi Co.). The adhesion results are also listed in the table below.

| Example | Initial peel force (N/dm) | Aged peel force 65 C. for 2 weeks (N/dm) | Peel force build ratio (peel force 65 C./initial peel force) | Initial adhesion to polyester film (N/dm) | Aged adhesion to polyester film 65 C. for 2 weeks (N/dm) |
|---|---|---|---|---|---|
| Comparative | 3.3 | 7.6 | 2.3 | 4.4 | 4 |
| 1 | 3.4 | 4.1 | 1.2 | 4.4 | 4.2 |
| 2 | 3 | 4 | 1.3 | 4.8 | 4 |
| 3 | 3 | 4 | 1.3 | 4.2 | 3.9 |
| 4 | 3 | 3.5 | 1.2 | 3.9 | 3.6 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A copolymer comprising the reaction product of:
   (a) (meth)acrylate functionalized nanoparticles selected from the group consisting of silica nanoparticles, zirconia nanoparticles, titania nanoparticles, and combinations thereof,
   (b) vinyl monomer, and
   (c) mercapto-functional silicone represented by the formula:

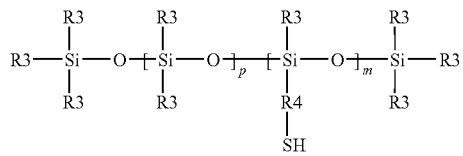

wherein:
   p=1 to about 1000,
   m=1 to about 40,
   R3 are monovalent moieties that can be the same or different and are independently selected from the group consisting of alkyl, aryl, alkaryl, alkoxy, alkylamino, hydroxyl, and fluoroalkyl, and
   R4 are divalent linking groups that can be the same or different and each R4 is independently selected from the group consisting of alkylene, alkarylene, and alkoxyalkylene, wherein the copolymer is a polysiloxane comprising Si—O—Si groups.

2. The copolymer of claim 1 wherein the (meth)acrylate functionalized nanoparticles are silica nanoparticles having a particle diameter size of about 5 nm up to about 100 nm.

3. The copolymer of claim 2 wherein the (meth)acrylate functionalized nanoparticles are the reaction product of silica nanoparticles and 3-methacryloxypropyltrimethoxysilane.

4. The copolymer of claim 2 wherein the (meth)acrylate functionalized nanoparticles are represented by the formula:

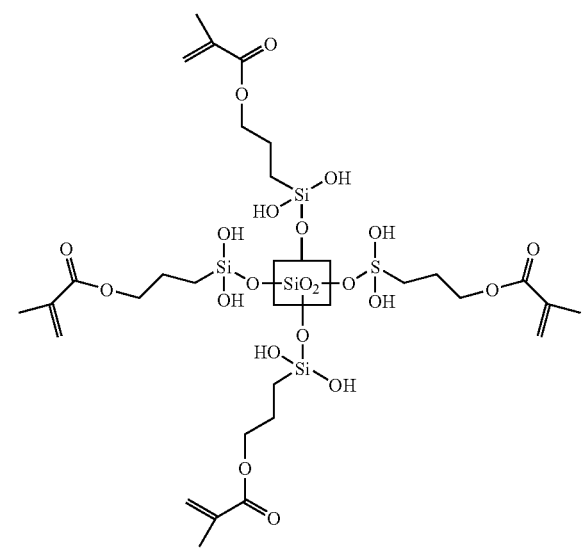

wherein

represents a silica nanoparticle.

5. The copolymer of claim 2 wherein the silica nanoparticles have an average particle diameter size of about 5 nm to about 20 nm.

6. The copolymer of claim 5 wherein the silica nanoparticles have an average particle diameter size of about 5 nm, about 8 nm, or about 20 nm.

7. The copolymer of claim 1 wherein p=about 50 to about 200.

8. The copolymer of claim 1 wherein m=about 2 to about 8.

9. The copolymer of claim 1 wherein the monovalent moieties R3 are selected to be alkyls that can be the same or different.

10. The copolymer of claim 9 wherein the monovalent moieties R3 are selected to be methyl groups.

11. The copolymer of claim 1 wherein R4 are alkylenes.

12. The copolymer of claim 11 wherein R4 are propylene groups.

13. The copolymer of claim 1 wherein the monovalent moieties R3 are selected to be methyl groups, and the divalent linking groups R4 are selected to be alkylenes and propylene groups, p=96, and m=4.

14. The copolymer of claim 1 wherein the vinyl monomer is selected from the group consisting of (meth)acrylate, styrene, (meth)acrylic acid, acrylonitrile, N-vinyl pyrrolidone, and mixtures thereof.

15. The copolymer of claim 14 wherein the vinyl monomer is selected from the group consisting of methyl (meth)acrylate, isobornyl (meth)acrylate, butyl (meth)acrylate, isopropyl (meth)acrylate, octadecyl (meth)acrylate, styrene, (meth)acrylic acid, acrylonitrile, N-vinyl pyrrolidone, and mixtures thereof.

16. The copolymer of claim 2 represented by the formula:

wherein:

represents a silica nanoparticle,

R2 is represented by the formula:

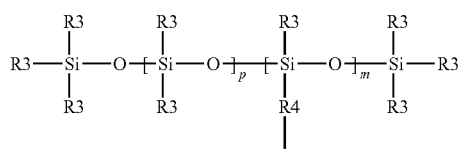

and each Q is a vinyl polymeric segment having an average molecular weight of about 500 to about 100,000.

17. The copolymer of claim 16, wherein the vinyl polymeric segments Q of the copolymer each have an average molecular weight of about 4,000 to about 8,000.

18. The copolymer of claim 1 wherein the weight ratio of (meth)acrylate functionalized silica nanoparticles to vinyl monomer and mercapto-functional silicone is about 10:90 or less.

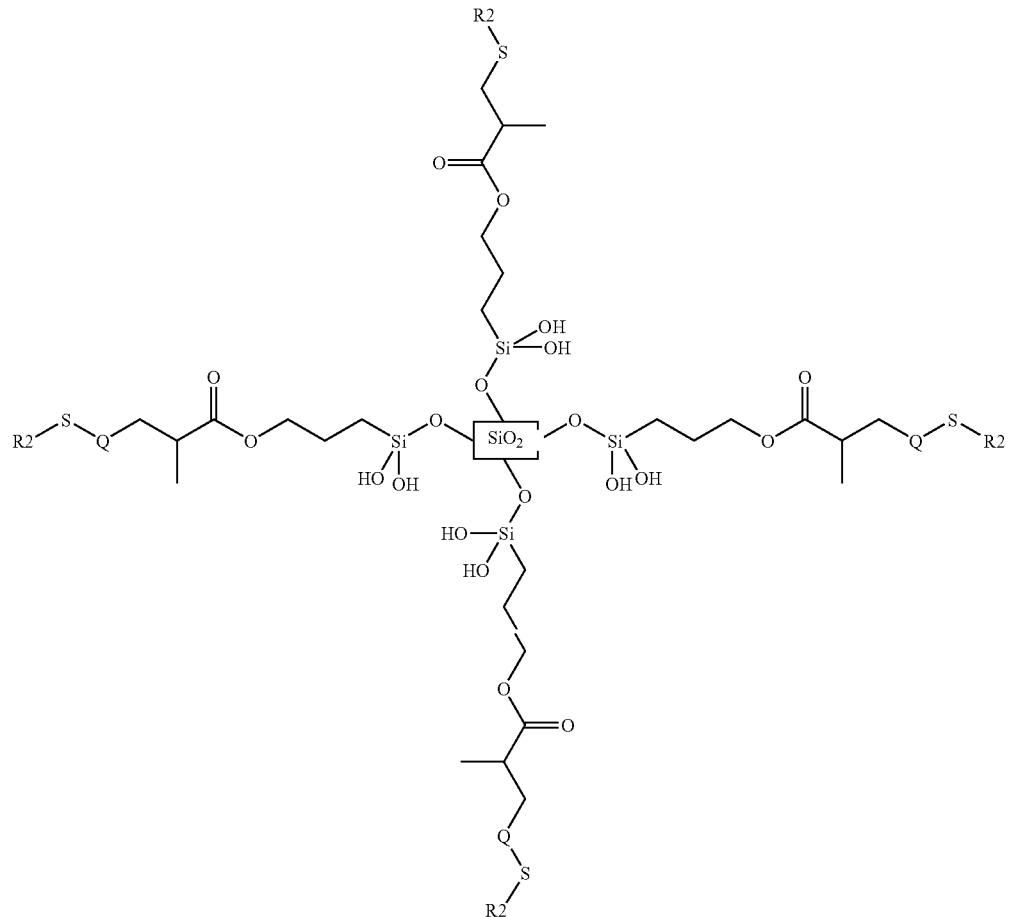

19. The copolymer of claim 1 wherein the weight ratio of mercapto-functional silicone to vinyl monomer is between about 10:90 and about 30:70.

20. A composition comprising the copolymer of claim 1, wherein the composition is a coatable release coating covering at least a portion of a first major surface of a flexible sheet, with an adhesive covering at least a portion of a second major surface of the flexible sheet.

\* \* \* \* \*